Oct. 19, 1965 D. PIETROROIA 3,212,793
STEERING CONTROL APPARATUS FOR TRAILERS
Filed Nov. 29, 1962 3 Sheets-Sheet 1
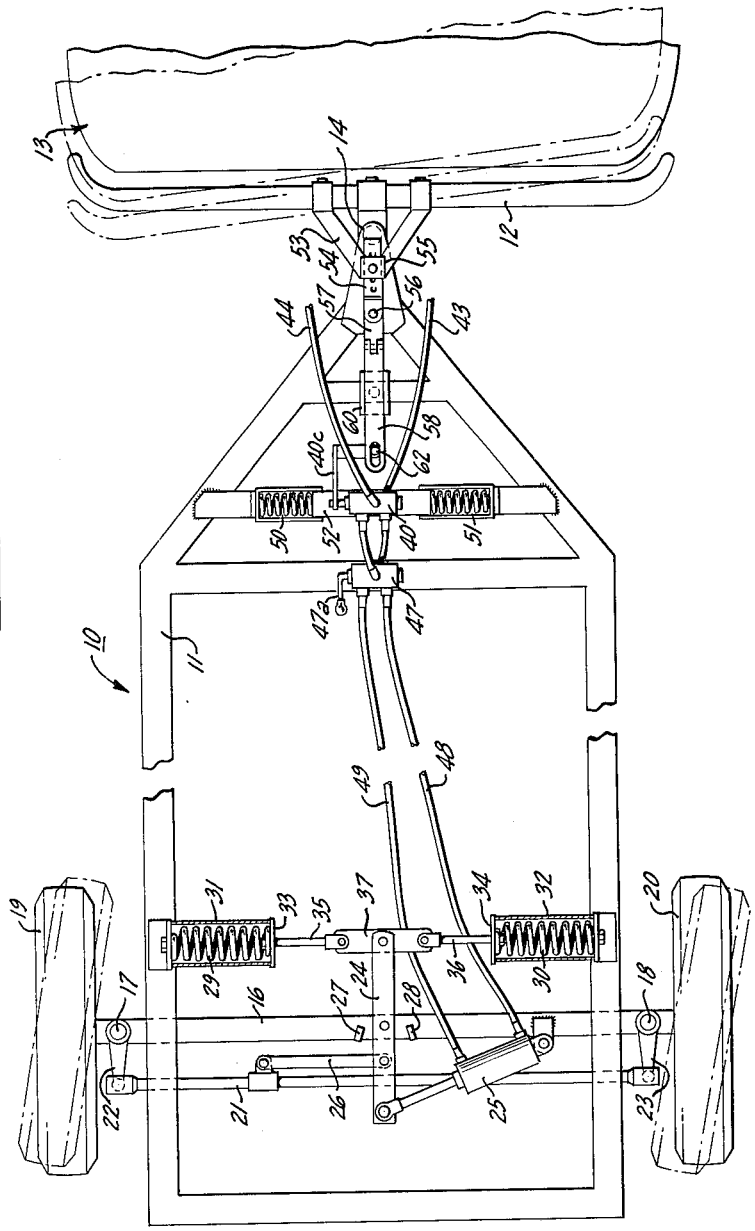
INVENTOR:—
DOMINIC PIETROROIA
BY
Mellin and Hanscom
ATTORNEYS

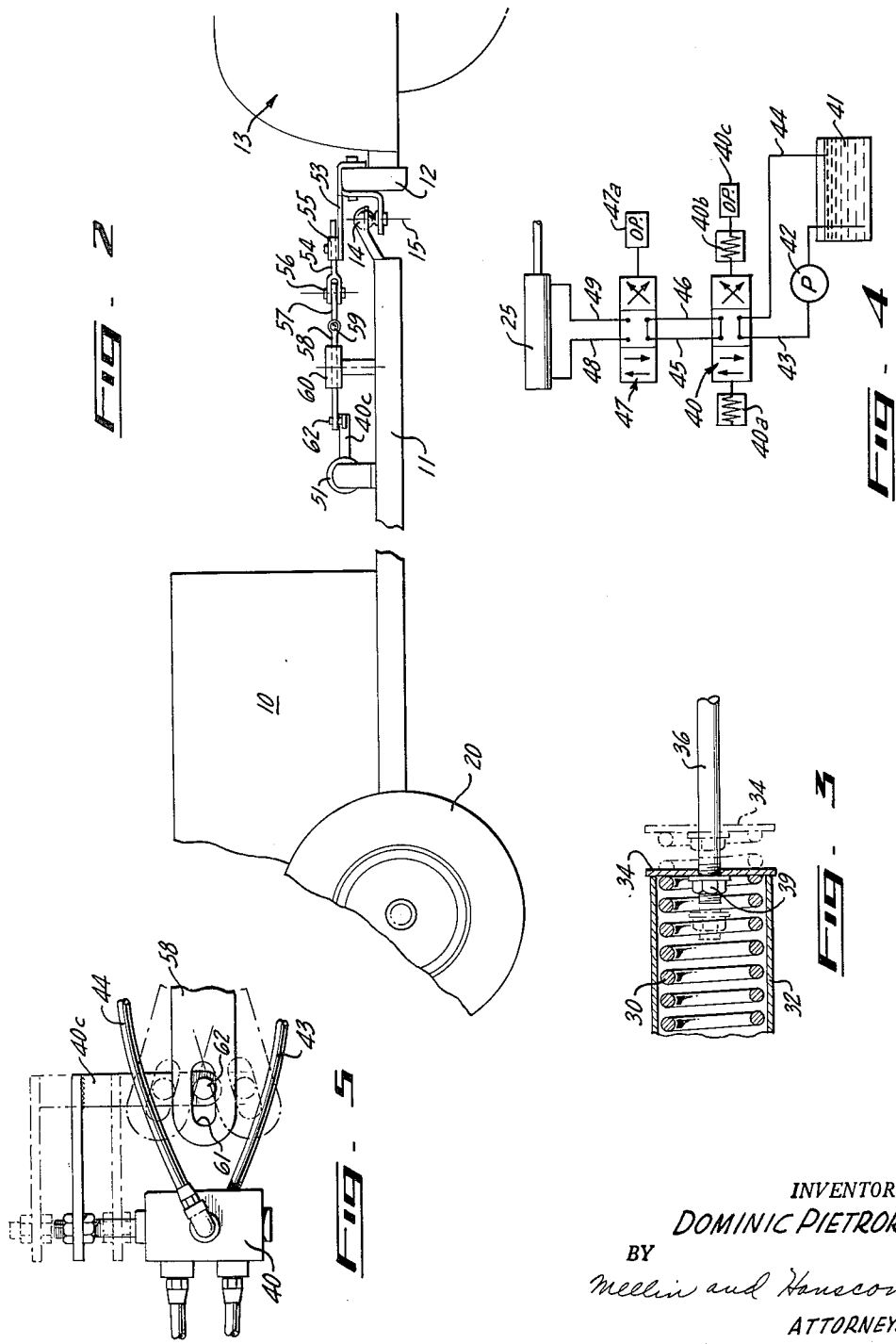

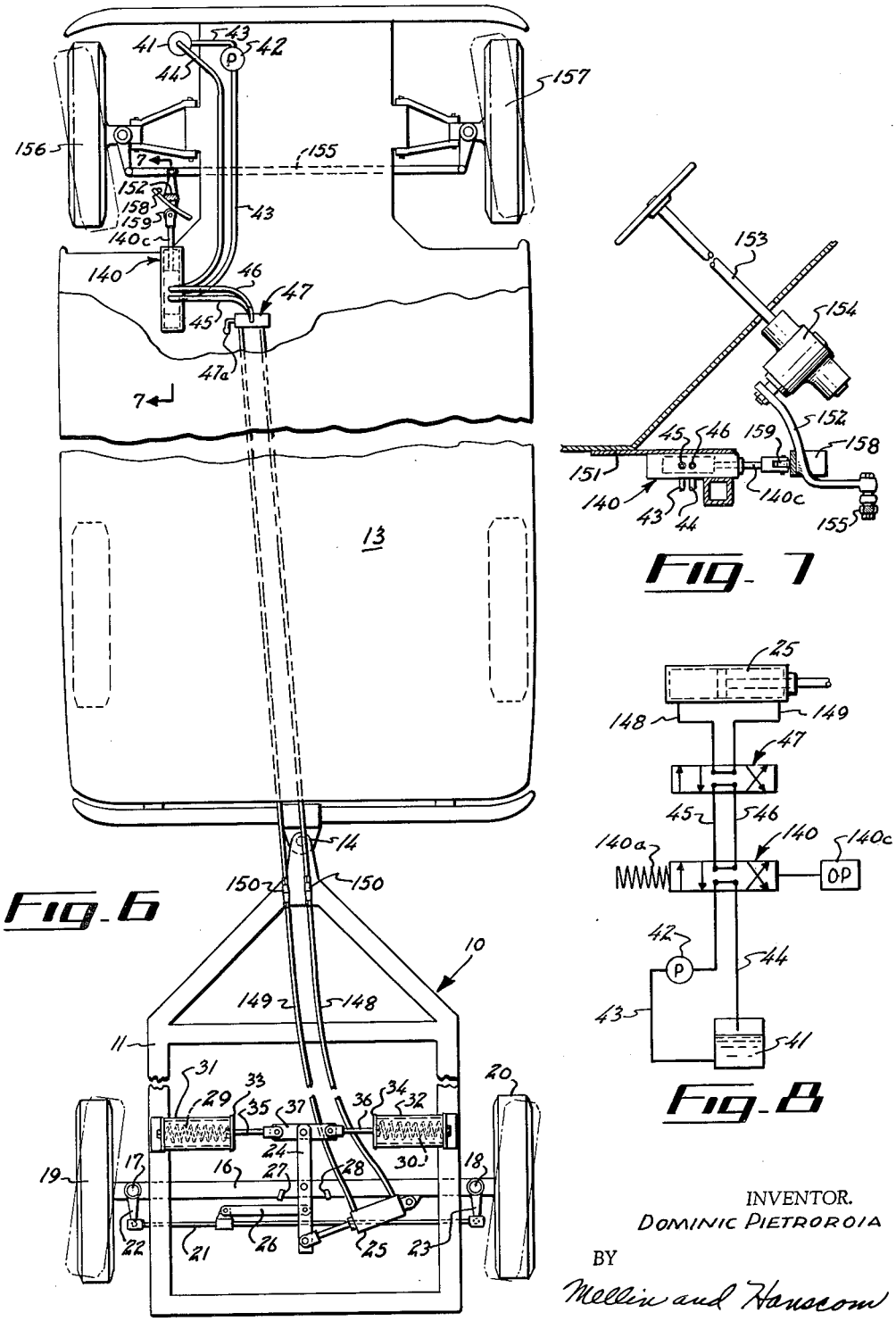

United States Patent Office 3,212,793
Patented Oct. 19, 1965

3,212,793
STEERING CONTROL APPARATUS FOR TRAILERS
Dominic Pietroroia, 138 30th Ave., San Mateo, Calif.
Filed Nov. 29, 1962, Ser. No. 242,041
9 Claims. (Cl. 280—443)

This invention relates to towing apparatus for trailers and more specifically to devices for making a trailer track its towing vehicle and to trailer devices which may be used to effectively inhibit or prevent trailer jackknifing as the trailer is backed up.

This application is a continuation in part of my application Serial No. 214,608, filed August 3, 1962, and now abandoned.

Although many forms of apparatus have been provided for guiding a trailer responsive to the movements of a towing vehicle, one important feature of the present invention is to provide a control apparatus having means including a fluid motor mounted upon a trailer frame for pivoting the trailer wheels and further including a control valve operated by the angular pivotal movement between the trailer frame and its towing vehicle for applying fluid pressure to said fluid motor. A second important feature of the invention is the alternative provision of control apparatus for pivoting the trailer wheels in response to operation of the steering mechanism of a towing vehicle. In both preferred embodiments of the invention, as hereinafter described, an apparatus including a pair of opposed tensioned springs is provided to bias the wheels of the towed trailer toward a fixed centermost position until acted upon by a fluid motor.

It is one object of this invention to provide generally improved towing devices of the character referred to, and to provide a control device which may be utilized on trailers of relatively large size as well as small.

Another object of the invention is to provide a towing device for trailers including a fluid motor and a control valve operated by angularity between the trailer frame and its towing vehicle.

Another object is to provide apparatus for trailers of the kind described including a fluid motor and a control valve operated by the steering controls of a towing vehicle.

Another object of the invention is to provide control apparatus of the kind described and further including a spring device resiliently urging the trailer wheels toward a centermost position.

Another object of the invention is to provide a steering and control apparatus of the kind described including a pair of opposed springs held under tension and including means responsive to movement of a control lever for additionally tensioning one or the other of said tensioned opposed springs.

Another object of the invention is to provide a steering and control apparatus of the kind described wherein the control valve operated by the angular pivotal movement between the trailer frame and towing vehicle is mounted to the trailer frame upon a resilient support.

An additional object of the invention is to provide a steering and control apparatus of the kind described including a directional control valve for reversing the application of fluid pressure to a fluid motor and further wherein said directional control valve includes a position for blocking the fluid flow from or to said fluid motor.

A still further object of the invention is to provide a steering and control apparatus of the kind described including a control valve having a neutral position of operation in which the lead lines to the fluid motor are interconnected for equalizing the pressure at opposite ends thereof.

A still further object of the invention is to provide a steering and control apparatus of the kind described including hydraulic operating means comprising a fluid reservoir, a fluid pressure line including a pump interconnecting said reservoir and a control valve, a return line interconnecting said control valve and said reservoir, a directional control valve, a pair of fluid connections interconnecting said control valve and said directional control valve, and a pair of fluid connections interconnecting said directional control valve with the fluid motor.

A still further object of the invention is to provide a steering and control apparatus of the kind described and including means pivotally mounted to a trailer frame and engageable with a valve operator of the control valve, and means for pivotally connecting said control means to the towing vehicle upon a vertical pivot axis displaced from the pivot axis of a trailer coupling.

Other objects of this invention will become apparent to persons skilled in the art, particularly in view of the drawings and the following detailed description.

In the drawings forming a part of this application, and in which like parts are identified by like reference numerals throughout the same, FIG. 1 is a plan view of a trailer chassis pivotally connected to a towing vehicle and embodying one form of this invention;

FIG. 2 is a side elevation of a portion of the apparatus shown in FIG. 1;

FIG. 3 is a detail of a portion of the operating mechanism;

FIG. 4 is a schematic diagram of a fluid system for operating the invention;

FIG. 5 is another detail view of a portion of the operating mechanism;

FIG. 6 is a plan view of a second embodiment of this invention and illustrating a trailer having pivoted wheels that are operated by the steering controls of a towing vehicle;

FIG. 7 is an enlarged section taken on lines 7—7 of FIG. 6; and

FIG. 8 is a schematic diagram of a portion of the fluid control system for operating the fluid motor as shown in FIG. 6.

Referring to FIGS. 1 and 2 in particular, there is shown a trailer 10 having a frame 11 coupled to the bumper 12 of a towing vehicle 13 by means of a conventional coupling device 14. Coupling device 14 allows pivotal movement between the trailer and vehicle as the vehicle turns in a known manner and upon a substantially vertical axis 15 as indicated.

Trailer 10 is provided with an axle housing 16 having pivots 17 and 18 at opposite ends, said pivots being mounted upon trailer wheels 19 and 20 respectively. Trailer wheels 19 and 20 are adapted to be simultaneously pivoted upon the axis pivots 17 and 18 by means of a connecting rod 21 pivotally secured to radial arms 22 and 23 of the wheel mounting.

A lever 24 is pivotally mounted upon axle housing 16 and is adapted to be moved with both clockwise and counterclockwise movement by the fluid motor or double-acting cylinder 25. As shown, the fluid motor 25 is pivotally supported upon the axle housing and pivotally secured to the end of lever 24. A rod 26 pivotally interconnects lever 24 and connecting rod 21, thereby transmitting pivotal movement of the lever 24 to connecting rod 21 for pivoting wheels 19 and 20. A pair of stops 27 and 28 are mounted to axle 16 on either side of lever 24, said stops imposing limits to the actuating movement of fluid motor 25. A spring device comprising a pair of opposed springs 29 and 30 are secured to frame 11, said springs being housed by cylinders 31 and 32, respectively. Each of the springs 29 and 30 is fixed at one of its ends to, and retained in a tensioned condition by the respective stop plates 33 and 34.

A pair of rods 35 and 36 are pivotally joined to a common lever 37, and lever 37 is pivoted to control lever 24. Rods 35 and 36 extend through openings formed in stop plates 33 and 34, respectively. A nut 39 is secured to the end of each rod, and is tightened against the inside face of stop plate 33 or 34 while lever 24 is in a neutral position as shown in FIG. 1.

Referring to FIG. 1, a clockwise movement of lever 24 will exert a pull on rod 35, moving stop plate 33 away from spring cylinder housing 31 and placing spring 29 in greater tension. Simultaneous with such a movement, rod 36 is telescoped into spring housing 32 through an opening in stop plate 34. A counterclockwise movement of lever 24 would effect directly opposite movements of rods 35 and 36. Accordingly, it will be seen that whenever lever 24 is pivoted from its centermost position by actuation of cylinder 25, one of the springs 29 or 30 will impose a resilient bias tending to return the lever 24 (and also wheels 19 and 20) into a centered position.

It is important, of course, that the tension forces stored by springs 29 and 30 in the center position shown should be great enough to hold lever 24 in its centered position unless acted upon by the more powerful cylinder 25. Moreover, to eliminate play or looseness in the linkage between the lever 37 and rods 35 and 36, it is desirable that nuts 39 be tightened to a degree imposing a slight tension through the linkage connection.

Cylinder 25 is operated by control means including a three-way valve 40 connected in a power circuit, such as shown in FIG. 4. Valve 40 is provided with fluid passages as indicated by its schematic showing, being adapted for receiving hydraulic fluid from a reservoir 41 through a pump 42 and a pressure line 43. The pressurized fluid may be returned to the reservoir when the spool of valve 40 occupies a neutral position through a return line 44; or by movement of its valve spool, valve 40 may connect lines 43 and 44 through lines 45 or 46, either respectively or oppositely. It will also be noted that valve 40 is constructed to interconnect lines 45 and 46 when its valve spool occupies a neutral position.

Lines 45 and 46 fluidly connect with a three-way directional control valve 47. In a neutral position of operation, valve 47 interconnects lines 45 and 46 and in its other two positions, interconnects lines 45 and 46 with cylinder leads 48 and 49, either respectively or oppositely. The valve spool of valve 47 is preferably constructed so as to block lines 48 and 49 when it occupies a neutral position, thereby differing from the valve spool construction of valve 40.

Referring again to FIG. 1, valve 40 is supported upon trailer frame 11 in a position proximate to coupling 14. More particularly, valve 40 is mounted upon a resilient support comprising a pair of spring devices 50 and 51, each held in partial compression by an intermediate plunger and support plate 52 to which valve 40 is attached. Spring devices 50 and 51 are relatively stiff compared with the neutral biasing springs 40a and 40b of valve 40. For this reason, the operator 40c of valve 40 may be moved without imparting movement to the valve body itself. However, after valve operator 40c has been moved to a position on either side of neutral, spring devices 50 and 51 permit movement of the valve body in the event that the operator 40c should be additionally moved. It will be evident, particularly in view of the operation described hereinafter, that the resilient mounting of valve 40 prevents damage thereto which otherwise might occur if the valve were immovable and if the valve operator should be actuated to a greater degree than necessary for changing positions of the valve spool.

Valve 47 may be mounted to frame 11 in proximate relation to valve 40. A manual valve operator 47a is shown, but it is also possible that the valve be operated by an electric solenoid. This would be of particular advantage in providing a remote operation of valve 47, as from within the cab of towing vehicle 13.

In view of the above description it will be evident that fluid pressure is directionally applied and relieved by operation of the valve operator 40c. This valve operator is in turn controlled and operated by the angular pivotal movement between trailer frame 11 and towing vehicle 13. For this purpose the control apparatus further includes a device similar to that shown and described in my copending application Serial No. 199,869 filed August 3, 1962, now abandoned.

Referring to FIGS. 1 and 2, a pivot support bracket 53 straddles hitch 14, said bracket having a rod 54 adjustably pinned within a sleeve 55. One end of rod 54 is bifurcated and fitted with a vertical pin 56 pivotally connecting rod member 57, which is also pivotally connected to a rod 58 by a horizontal pin 59. Rod 58 freely slides into a guide sleeve 60 pivotally supported upon a crossbar of frame 11. The rearwardly projected end of rod 58 is formed with an elongate slot 61 that receives a pin 62 secured to the operator 40c of a valve 40.

It will be seen that any angularity between towing vehicle 13 and trailer 10 will be reflected by an angular displacement of pin 56 relative to trailer frame 11, since pin 56 is more distant from vehicle 13 than is axis 15 of coupling 14. Accordingly, the angular movement of pin 56 will pivot sleeve 60 and rods 57 and 58, thereby actuating the valve operator 40c to either side of its neutral position. Pin connection 59 provides the necessary flexibility to accommodate dips or humps in a roadway, while the elongate slot 61 of rod 58 provides an extended connection for operating valve operator 40c when pin 56 is angularly displaced.

In operation, valve 47 is initially conditioned for passing fluid from lines 45 and 46 into cylinder leads 48 and 49. The specific condition of valve operation is to be determined by the desired operation. For example, if trailer 10 is to be controlled so that it will properly track vehicle 13 while being moved forwardly, then valve 47 is positioned so that lines 45 and 48 are fluidly interconnected and lines 46 and 49 are fluidly interconnected. On the other hand, if an anti-jackknife feature is to be obtained so that the trailer may be easily backed up, then lines 45 and 49 are connected while lines 46 and 48 are connected.

The intermediate position of valve 47 is utilized for blocking any fluid flow into cylinder 25 as might be done during open road driving, where perhaps no actuating control is desired. However, the intermediate position of valve 47 might also be used to retain or lock the wheels 19 and 20 in pivoted positions after they have been initially turned by imposing an augularity between trailer 10 and vehicle 13. This operation could be employed to maneuver the trailer into locations or parking positions which might otherwise be impossible or inaccessible.

An exemplary operation of the apparatus will now be described:

Assuming valve 47 is conditioned so that trailer 10 will properly track vehicle 13 while being moved forwardly, and further assuming vehicle 13 makes an abrupt left turn so as to create an angularity between trailer and vehicle (as indicated by the broken lines of the vehicle and solid lines of the trailer in FIG. 1), then the control means described, including control valve 40 operated by the angular pivotal movement between frame 11 and vehicle 13, will apply fluid pressure to fluid motor 25, turning wheels 19 and 20 into their broken line positions, shown in FIG. 1. This fluid operation may be traced on the schematic diagram of FIG. 4, it being understood that valve operator 40c is moved by rod 58 to interconnect line 43 with line 45, and line 44 with line 46. Since valve 47 is conditioned such that lines 48 and 45 are connected, and lines 46 and 49 are connected, fluid motor 25 will pivot lever 24 clockwise against the biasing force of tension spring 29.

After vehicle 13 and trailer 10 complete the turn, and when valve operator 40c is allowed to return to a center position under the bias of spring 40b, pressure line 43 is shunted to return line 44 while lines 45 and 46 are also interconnected. The biasing force of spring 29 is of sufficient strength to return wheels 19 and 20 to their centermost position, and during this movement the fluid in lines 48 and 45 is driven into lines 46 and 49 until the fluid pressure forces at opposite ends of cylinder 25 are balanced.

The operation of the mechanism for a right turn of the vehicle is exactly the same as that described for a left turn, the only difference being the interconnection of fluid lines passing the pressurized fluid into and from cylinder 25. Moreover, it will be evident that a reverse connection of valve 47, when used for backing trailer 10, will merely reverse the direction of wheel pivoting, although the actuating control will still respond to the angularity between the trailer and towing vehicle.

FIGS. 6–8 illustrate a second embodiment of the invention using much of the same apparatus described in connection with the embodiment of FIGS. 1–5. In this respect, the trailer wheels 19 and 20 are pivotally operated and centered by exactly the same structures shown in FIG. 1. The difference between the embodiments resides mainly in the type of control means employed for driving the trailer wheels against the bias of the opposed springs 29 and 30.

Referring to FIG. 6 in particular, it will be noted that a pair of fluid pressure lines 148 and 149 interconnect the fluid motor 25 with a direction control valve 47 mounted to the towing vehicle 13. Lines 148 and 149 are substantially identical to lines 48 and 49, respectively, but further contain rapid disconnects 150 in each line. Disconnects 150 are positioned near the pivot connection 14 between vehicle 13 and trailer 10. Direction control valve 47 may be conveniently disposed within the vehicle 13 and made readily accessible to the driver.

The movement of trailer wheels 19 and 20 is controlled by operation of a three-way valve 140 connected in a power circuit schematically shown in FIG. 8. It will be evident that the passage connections of valve 140 are identical to those of valve 40, but valve 140 is biased into one of its two positions on either side of center by a spring bias 140a and operated into its other two positions by a valve operator 140c.

Referring to FIG. 7, valve 140 is shown mounted to the framework 151 of vehicle 13, and disposed in a position closely proximate to the steering lever 152. Lever 152 forms a part of conventional steering apparatus that includes a steering column 153 and a motion translating means 154. In the conventional steering apparatus shown, lever 152 pivotally connects to a tie rod 155 (or equivalent connections) for producing pivotal movement of the vehicle wheels 156 and 157. It will be evident that lever 152, when operated by movement of the steering column 153 moves transversely relative to the valve spool of valve 140.

A cam plate 158 is welded or otherwise secured to the lower end of lever 152, and a roller member 159 mounted to the end of valve operator 140c is constantly held against the surface of cam plate 158 by the spring bias 140a, which forms an integral part of the valve itself.

The cam profile of cam plate 158 is formed such that movement of lever 152 will operate valve 140 in response to the directional movement of wheels 156 and 157. Although the cam profile shown is of a continuous rise from the high end to a low end, this profile may be shaped to effect a rapid operation of valve 140 when the vehicle wheels 156 and 157 are turned a substantial amount, as when the vehicle 13 is turning a corner.

The operation of apparatus shown in FIGS. 6–8 is substantially the same as the operation described in connection with the apparatus of FIGS. 1–5. The essential difference is that control valve 140 is operated by turning movement of the towing vehicle's steering control, while the control valve 40 is operated by the angularity between the towing vehicle and trailer. It has been found that a more responsive control apparatus is produced when the steering apparatus of the towing vehicle is utilized, but in many respects both systems of operation produce the same desirable results.

It is to be understood that the forms of the invention herewith shown and described are to be taken as preferred examples thereof, and that various changes may be made in the shape, size and arrangement of certain parts without departing from the spirit of the invention or the scope of the attached claims, and each of such changes is contemplated.

Having thus described my invention, what I claim and desire to secure by Letters Patent is:

1. A steering and control apparatus for trailers having a frame supported upon pivoted wheels and adapted to be coupled to a towing vehicle, comprising:
   (a) means including a fluid motor mounted upon said frame for pivoting said wheels from a centermost position into positions on either side thereof;
   (b) spring means resiliently urging said wheels toward a centermost position; and
   (c) control means including a control valve for directionally applying fluid pressure to said fluid motor and turning said wheels in opposition to said spring means and including fluid connections for short-circuiting said fluid motor when said control valve is operated into a neutral position.

2. The steering and control apparatus of claim 1 wherein said control means includes a second valve for reversing the application of fluid pressure to said fluid motor.

3. The steering and control apparatus of claim 2 wherein said second valve includes a position for blocking a fluid flow from or to said fluid motor.

4. The steering and control apparatus of claim 1 wherein said control means further comprises a fluid reservoir, a fluid pressure line including a pump interconnecting said reservoir and said control valve, a return line interconnecting said reservoir and said control valve, a reversing valve, a pair of fluid conections interconnecting said control valve and said reversing valve, and a pair of fluid connections interconnecting said reversing valve with said fluid motor.

5. The steering and control apparatus of claim 1 wherein said control means further comprises a rod member pivotally mounted to said trailer frame and adapted for operating said control valve, and means pivotally connecting said rod member to the towing vehicle upon a vertical pivot axis displaced from the pivot axis of the trailer coupling means to provide a moment arm of actuation.

6. The steering and control apparatus of claim 1 wherein said control means further comprises a control valve operating device mounted to said towing vehicle and operated by movement of the steering controls for said vehicle.

7. The steering and control apparatus of claim 6 wherein said control valve operating device comprises a cam plate secured to the steering controls, and a follower mounted to the valve spool of said control valve, said follower being disposed in positional relationship for engagement with said cam plate.

8. A steering and control apparatus for trailers having a frame supported upon pivoted wheels, and means for coupling the trailer to a towing vehicle upon a pivot, comprising:
   (a) means including a fluid motor mounted upon said frame for pivoting said trailer wheels from a centermost position into positions on either side thereof;
   (b) spring means resiliently urging said wheels toward a centermost position;

(c) a control valve;

(d) control means pivotally mounted to said trailer frame and engageable with a valve operator of said control valve for operating said valve by the angular pivotal movement between said trailer frame and said towing vehicle by applying fluid pressure to said fluid motor and turning said wheels; and (e) means for pivotally connecting said control means to said towing vehicle upon a vertical pivot axis displaced from the pivot axis of said trailer coupling means to provide a moment arm of actuation.

9. A steering and control apparatus for trailers having a frame supported upon pivoted wheels and adapted to be coupled to a towing vehicle, comprising:

(a) means including a fluid motor mounted upon said frame for pivoting said wheels from a centermost position into positions on either side thereof; and (b) control means; including a control valve mounted to said towing vehicle and operated by the steering mechanism of said towing vehicle and a cam plate secured to said steering mechanism of said vehicle, and a follower mounted to the valve spool of said control valve, said follower being disposed in positional relationship for engagement with said cam plate; for directionally applying fluid pressure to said fluid motor and turning said wheels.

References Cited by the Examiner

UNITED STATES PATENTS

| | | | |
|---|---|---|---|
| 1,271,537 | 7/18 | Bright | 280—94 |
| 1,346,211 | 7/20 | Johnson | 280—94 |
| 1,468,448 | 9/23 | Johnson | 280—94 |
| 2,510,525 | 6/50 | Smart et al. | 280—443 |
| 2,818,275 | 12/57 | Hollowell | 280—443 |
| 3,092,201 | 6/63 | Biek | 180—79.2 |

A. HARRY LEVY, *Primary Examiner.*

LEO FRIAGLIA, *Examiner.*